Figure 1:
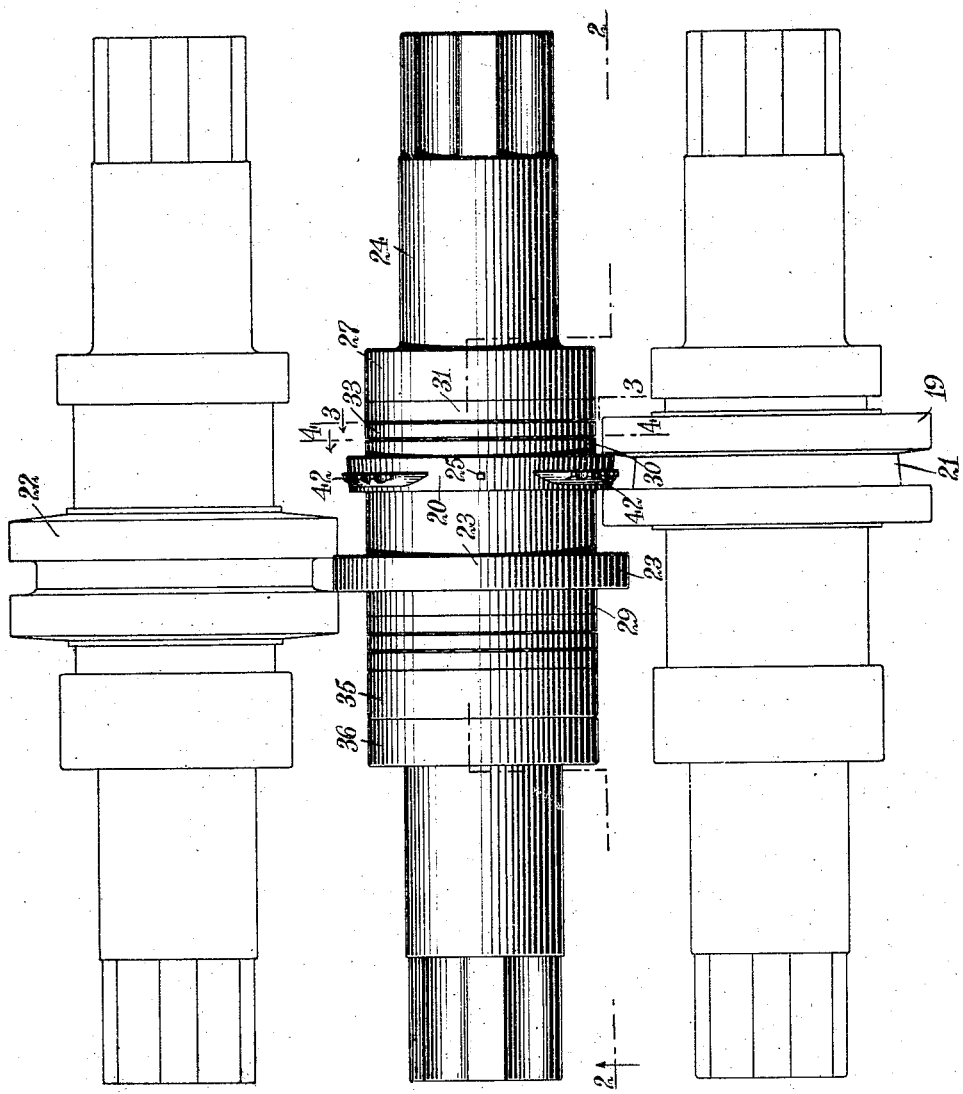

L. T. PAGE.
SHAPING ROLLS FOR HORSESHOE BARS.
APPLICATION FILED JUNE 24, 1913.

1,086,933.

Patented Feb. 10, 1914.

2 SHEETS—SHEET 1.

WITNESSES

INVENTOR
Luther T. Page
BY
ATTORNEYS

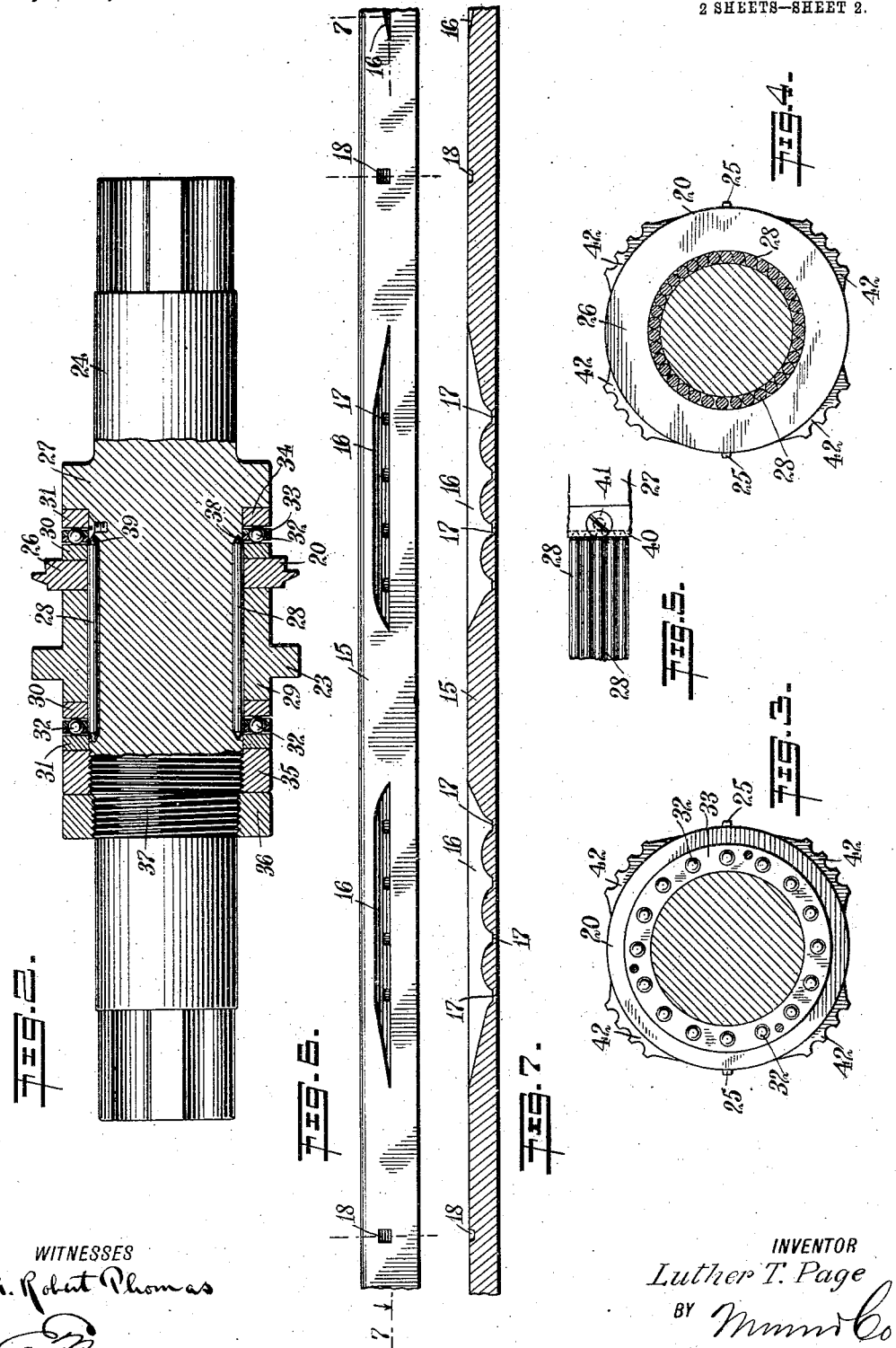

UNITED STATES PATENT OFFICE.

LUTHER T. PAGE, OF WAREHAM, MASSACHUSETTS.

SHAPING-ROLLS FOR HORSESHOE-BARS.

1,086,933.  Specification of Letters Patent.  Patented Feb. 10, 1914.

Application filed June 24, 1913. Serial No. 775,476.

*To all whom it may concern:*

Be it known that I, LUTHER T. PAGE, a citizen of the United States, and a resident of Wareham, in the county of Plymouth and State of Massachusetts, have invented new and Improved Shaping-Rolls for Horseshoe-Bars, of which the following is a full, clean, and exact description.

Among the principal objects which the present invention has in view are: To provide means for mechanically creasing and partially punching the bars from which horseshoes are subsequently made; to prevent the creeping or misregistering of the rolls with the bars and shoe-forming sections thereof; to reduce the friction offered by the bars to the rolls when passing therethrough; and to provide rolls of the character mentioned, having a simplified and economical construction.

One embodiment of the present invention is shown in the accompanying drawings, in which—

Figure 1 is an elevation of paired rolls employed in shaping the bars above mentioned, constructed and arranged in accordance with the present invention; Fig. 2 is a side view, partly in section, of the improved roll, the section being taken on the line 2—2 in Fig. 1; Fig. 3 is a cross section taken on the line 3—3 in Fig. 1; Fig. 4 is a cross section taken on the line 4—4 in Fig. 1; Fig. 5 is a detail view showing a fragment of the roller bearings; Fig. 6 is a top view of a fragment of the bar from which horseshoes are made, for the construction of which the present apparatus is designed; Fig. 7 is a longitudinal section taken on the line 7—7 in Fig. 6.

The product of rolls of the class to which the present invention belongs is shown substantially in Figs. 6 and 7 of the drawings. Long bars of metal 15 have imparted thereto elongated depressions or creases 16, in which, when the horseshoe is secured to the hoof of the animal, the heads of the securing nails are disposed. The bottom of the creases 16, as shown particularly in Fig. 7 of the drawings is waived to provide thin sections 17, which are punched through to form holes for the nails by which the said shoes are secured to the hoofs of the animal.

The creases 16 are arranged in pairs, as shown in Fig. 6 of the drawings. The various pairs are divided, and the median line between the divisions is marked on the bars by nicks 18. The nicks 18 are disposed so that when the bar 15 is separated into short segments, the ends having a portion of said nicks are shaped to form the heels of the completed shoe.

It will be understood that when the straight bar, either in the shape of short sections or complete bar lengths, is converted into shoes, these are shaped about the form by being bent edgewise, the openings of the creases 16 being in position to face the ground when the shoe is in service.

What may be termed the final or finishing step in the operation is that where the bars are passed between a grooved or female roll 19 and a die or male roll 20. The roll 20 registers with the groove 21 of the roll 19, to sink between the upper edges of the side walls thereof. The bar, when passed between these rolls, is sufficiently hot to readily change its shape, which, however, is preserved in the passage by the side walls and bottom of the groove 21 and the top or crown wall of the die 20. After passing between the female roll 19 and male roll 20, the bar is returned between the grooved or female roll 22 and the male roll 23, where said bar receives its final shape in cross section, and is thereafter cooled, ready for transhipment or handling.

In the conventional or usual form of these rolls, the male rolls 20 and 23 are integrally formed with, or rigidly mounted upon, shafts 24. To accommodate the different sizes of shoes, the roll 20 is varied; different rolls having different diameters, for the reason that it is an essential to the operation of the rolls that the punch points 25 shall mark the nicks 18 in the bar 15 at proper intervals to form short bars of the requisite length from which to construct horseshoes. While the male rolls 20 and parts connected therewith are varied, the rolls 19 and 22 are maintained constant. As a result of this construction, the bars 15 are fed by the roll 19 at a speed equal to the peripheral travel of said roll and of the groove 21 therein. As this speed may vary materially from the speed of the roll 20, it will be seen that a misregister of the punch points 25 ensues, and that, further, due to the variation in the peripheral travel of the rolls 20 as compared to that of the rolls 19, the bars 15, as passed therebetween, may be curled upward or downward, necessitating a re-handling to straighten same. Further, it will be observed that the variation in peripheral travel of said rolls operates to produce a friction or resistance to the advancement of the bars.

To overcome the above objection, I form the roll 20 as a separate ring 26. The ring 26 is rotatable on the shaft 24, the anvil section 27 whereof is provided with an annular groove to form a bearing for small rollers 28. The rollers 28 likewise extend below the tubular body 29 on which is formed the male roll 23. The rolls 20 and 23 are spaced apart, as shown best in Fig. 2 of the drawings, and are held in position by rings or collars 30, forming end-thrust bearings for said rolls. Corresponding bearing rings 31 are provided to receive the thrust of balls 32, which, in conjunction with holding rings 33, form a thrust bearing for the rolls 20 and 23.

The anvil section 27 is provided with a shoulder 34, to resist the thrust of a clamp nut 35 when exerted to press upon the ring 31 and intermediate members, including the rolls 20 and 23. A nut 35 and a follower nut 36 are mounted upon a screw-threaded section 37 with which the shaft 24 is provided, see Fig. 2 of the drawings.

The rollers 28 have each tapered ends 38, to receive which, undercut grooves 39 are formed. The overhanging wall of one of said grooves is unbroken. The overhanging wall 40 of the opposite groove is parted to permit the passage downward of one of the rollers 28. The opening thus formed in the overhanging wall 40 is closed, when in service, by a screw 41, as seen best in Fig. 5 of the drawings.

It will be observed that when thus constructed and mounted, the roll 20 and ring 26 forming the same, and the roll 23 are independently and freely rotatable on the shaft 24. When, now, the bar 15 is passed between the rolls 19 and 20, said bar operates to rotate the roll 20, the periphery whereof travels in unison with the engaged surface of said bar; or, in other words, the roll 20 rotates as an idler at a speed uniform with the engaged surface of the bar 15. By reason of this construction, the opposite surfaces of the bar travel at the same rate of speed, and the slippage, curling and misregistering of the points 25 above referred to, do not here occur. Likewise, the die sections 42 with which the roll 20 is provided perfectly register with the bars 15, irrespective of the diameter of the rolls 19 and 20.

It will also be observed that the sensitive bearing formed by the rollers 28 and balls 32 reduces the friction or drag of the ring 26 and the tubular body 29 of the roll 23, thus reducing the required amount of manual exertion, and avoiding the consequent curling of the bar 15.

I claim—

In combination, a grooved pressure roll, and a freely rotating die roll operating in conjunction with said pressure roll, to be moved thereby in unison therewith when frictionally engaged by an interposed article under treatment.

In testimony whereof I have signed my name to this specification in the presence of two subscribing witnesses.

LUTHER T. PAGE.

Witnesses:
E. F. MURDOCK,
R. L. PAGE.

---

Copies of this patent may be obtained for five cents each, by addressing the "Commissioner of Patents, Washington, D. C."